United States Patent [19]
Stein et al.

[11] Patent Number: 5,155,818
[45] Date of Patent: Oct. 13, 1992

[54] UNCONDITIONAL WIDE BRANCH INSTRUCTION ACCELERATION

[75] Inventors: James B. Stein, Grafton; David L. Keating, Holliston; Richard W. Reeves, Westboro, all of Mass.

[73] Assignee: Data General Corporation, Westboro, Mass.

[21] Appl. No.: 250,355

[22] Filed: Sep. 28, 1988

[51] Int. Cl.⁵ ............................................. G06F 9/42
[52] U.S. Cl. ............................ 395/375; 364/261.3; 364/261.4; 364/263.1; 364/259.9; 364/DIG. 1
[58] Field of Search .................................. 395/375; 364/200 MS File, 900 MS File

[56] References Cited

U.S. PATENT DOCUMENTS

| | | | |
|---|---|---|---|
| 4,255,785 | 3/1981 | Chamberlain | 364/200 |
| 4,363,091 | 12/1982 | Pohlman | 364/200 |
| 4,446,518 | 5/1989 | Casamatta | 364/200 |
| 4,722,050 | 1/1988 | Lee et al. | 364/200 |
| 4,725,947 | 2/1988 | Shonai | 364/200 |
| 4,755,966 | 7/1988 | Lee | 364/900 |
| 4,758,949 | 6/1988 | Wada et al. | 364/200 |
| 4,773,002 | 9/1988 | Iwasaki et al. | 364/200 |
| 4,777,587 | 10/1988 | Case et al. | 364/200 |
| 4,802,113 | 1/1989 | Onishi | 364/900 |
| 4,827,402 | 5/1989 | Wada | 364/200 |

FOREIGN PATENT DOCUMENTS

| | | |
|---|---|---|
| 0180725 | 5/1986 | European Pat. Off. |
| 0207665 | 1/1987 | European Pat. Off. |
| 0208181 | 1/1987 | European Pat. Off. |
| 0229619 | 7/1987 | European Pat. Off. |

*Primary Examiner*—Thomas C. Lee
*Assistant Examiner*—Eric Coleman
*Attorney, Agent, or Firm*—Robert F. O'Connell

[57] ABSTRACT

A method and system for handling a branch instruction which requires branching from a current instruction of a first instruction sequence to the first instruction of a second instruction sequence. The branch instruction is fetched and the next instruction of the first sequence is fetched while the branch instruction is displacement formatted. The first instruction of the second sequence is fetched while such next instruction is displacement formatted and the branch instruction is executed. The second instruction of the second sequence is fetched while the first instruction is displacement formatted, but the next instruction of the first sequence is not executed so that an execution wait occurs. The third instruction of the second sequence is then fetched while the second instruction is displacement formatted and the first instruction is executed.

8 Claims, 6 Drawing Sheets

| STEP | IR | DISPLACEMENT | EXECUTION |
|---|---|---|---|
| | . | . | . |
| | . | . | . |
| | . | . | . |
| 1. | IR ← 2002<br>IR - JUMP $100_{2001}$ | DISP ← JUMP$100_{2001}$<br>DISP - STA$_{2000}$<br>DV - 1  NDV - 1 | IPOP<br>EFA: JUMP $100_{2001}$-<br>WW<br>LA ← 500 |
| 2. | IR ← 2003<br>IR - 2002 | DISP ← 2002<br>DISP - JUMP $100_{2001}$<br>DV - 1  NDV - 0 | STA<br>EFA: JUMP $100_{2001}$-<br>IPST<br>PC ← PA ← LA ← 100 |
| 3. | IR ← LDA$_{100}$<br>IR - 2003 | DISP ← 2003<br>DISP - 2002<br>DV - 0  NDV - 0 | JUMP 100<br>EFA: NOP |
| 4. | IR ← LDA$_{101}$<br>IR - LDA$_{101}$ | DISP ← LDA$_{100}$AC0,500<br>DISP - LDA$_{2003}$<br>DV - 0  NDV - 1 | WAIT<br>EFA: NOP |
| 5. | IR ← ADD$_{102}$<br>IR - LDA$_{101}$ | DISP ← LDA$_{101}$ACI,501<br>DISP - LDA$_{100}$<br>DV - 1  NDV - 1 | WAIT<br>EFA: LDA$_{100}$-<br>RW<br>LA ← 500 |
| 6. | IR ← STA$_{103}$<br>IR - ADD$_{102}$ | DISP ← ADD$_{102}$<br>DISP - LDA$_{101}$<br>DV - 1  NDV - 1 | LDA$_{100}$-<br>AC0 ← MEM[500]<br>EFA: LDA$_{101}$-<br>RW<br>LA ← 501 |
| 7. | IR ← WBR .+$50_{104}$<br>IR - STAW$_{103}$ | DISP ← STA$_{103}$ACI,502<br>DISP - LDA$_{102}$<br>DV - 1  NDV - 1 | LDA$_{101}$-<br>ACI ← MEM[500]<br>EFA: ADD$_{102}$ - NOP |
| 8. | IR ← (105)<br>IR - WBR .+$50_{104}$ | DISP ← WBR .+$50_{104}$<br>DISP - STA$_{103}$<br>DV - 1  NDV - 1 | ADD$_{102}$<br>EFA: STA$_{103}$-<br>WW<br>LA ← 502 |

FIG. I

| STEP | IR | DISPLACEMENT | EXECUTION |
|---|---|---|---|
| 9. | IR ← (106) —10<br>IR - (105) | DISP ← (105)<br>DISP - WBR .+$50_{104}$<br>DV - 1  NDV - 0 | $STA_{103}$<br>EFA:WBR .+$50_{104}$-<br>IPST<br>LA ← 154 |
| 10. | IR ← $DIV_{154}$<br>IR - (106) | DISP ← (106) —11<br>DISP - (105)<br>DV - 0  NDV - 0 | WBR<br>EFA:NOP |
| 11. | IR ← $MUL_{155}$<br>IR - $DIV_{154}$ | DISP ← $DIV_{154}$<br>DISP - (106)<br>DV - 0  NDV - 1 | WAIT —12<br>EFA:NOP |
| 12. | IR ← (156)<br>IR - $MUL_{155}$ | DISP ← $MUL_{155}$<br>DISP - $DIV_{154}$<br>DV - 1  NDV - 1 | WAIT<br>EFA:$DIV_{154}$(NOP) |
| 13. | IR ← (157)<br>IR - (156) | DISP ← (156)<br>DISP - $MUL_{155}$<br>DV - 1  NDV - 1 | DIV<br>IFA:$MUL_{155}$(NOP) |
| . | . | . | . |

FIG.2 PRIOR ART

| STEP | IR | DISPLACEMENT | EXECUTION |
|------|-----|--------------|-----------|
| 9A. | IR ← $DIV_{154}$<br>IR - (105) | DISP ← (105)<br>DISP - WBR .+$50_{104}$<br>DV - 1  NDV - 0 | STA<br>EFA:WBR .+50 (WBR) |
| 10A. | IR ← $MUL_{155}$<br>IR - $DIV_{154}$ | DISP ← $DIV_{154}$<br>DISP - (105)<br>DV - 0  NDV - 1 | WBR<br>EFA:NOP |
| 11A. | IR ← (156)<br>IR - $MUL_{155}$ | DISP ← $MUL_{155}$<br>DISP - $DIV_{154}$<br>DV - 0  NDV - 1 | WAIT<br>EFA:$DIV_{154}$ (NOP) |
| 12A. | IR ← (157)<br>DISP - 156 | DISP ← (156)<br>DISP - $MUL_{155}$<br>DV - 1  NDV - 1 | DIV<br>EFA:$MUL_{155}$(NOP) |

FIG. 3

| PRIOR ART<br>SEQUENCE | NEW<br>SEQUENCE |
|-----------------------|-----------------|
| STA | STA |
| JMP | JMP |
| WAIT | WAIT |
| WAIT | WAIT |
| LDA | LDA |
| LDA | LDA |
| ADD | ADD |
| STA | STA |
| WBR | WBR |
| WAIT | WAIT |
| WAIT | DIV |
| DIV | MUL |
| . | . |
| . | . |
| . | . |

FIG. 3A

UNCONDITIONAL WIDE BRANCH INSTRUCTION ACCELERATION

INTRODUCTION

This invention related generally to the processing of instructions in a digital data processing system and, more particularly, to an improved technique for processing a branch instruction during the execution of an instruction sequence.

BACKGROUND OF THE INVENTION

In processing an instruction sequence it is often necessary to branch off from the execution of a particular instruction sequence to an instruction at a location which is displaced from the location of a current instruction. The location that is branched to may be referred to as a "branch target" or a "target location." Such a process is often referred to as "branch" or sometimes a "wide branch" instruction and requires a certain number of processor operating cycles for its performance. Such an instruction might be contrasted with a "jump" instruction which requires a jump to any location not necessarily a location relatively closely displaced from the location of a current instruction.

The difference between a branch and a jump can be understood in the context of the MV-Series of data processing systems as made and sold by Data General Corporation of Westboro, Mass., for example. As used in connection with such systems, a jump is normally thought of as being made from a current location in memory to substantially any other location in memory, while a branch is normally thought of as being limited to one made from a current location as designated in a program counter (PC) to a location which is within a specified number of locations from such current location, e.g., to a location within a range from PC +127 to PC −128.

Since it is desirable generally to accelerate the processing of instructions in a digital computer or data processing system, it is helpful to devise techniques for reducing the number of operating cycles required to perform selected processing operations. One such operation which can be so accelerated is such a wide branch instruction operation.

BRIEF SUMMARY OF THE INVENTION

The invention involves a technique for performing a wide branch instruction in a time period which requires one less processor operating time cycle than required in accordance with the technique previously utilized for such purpose. In accordance with the new technique, a modification of an existing hardware configuration permits the elimination of certain fetching, instruction parsing, operand formatting, (sometimes referred to as displacement formatting, particularly as used in connection with the aforesaid Data General MV-Series of computers), and execution operations to eliminate one operating time cycle normally required when using the previously unmodified hardware configuration. The hardware and method of use thereof for the technique of the invention avoids the necessity for fetching a superfluous instruction (i.e., an instruction which ultimately will not be used in the sequence) which normally is fetched by existing hardware because the existing hardware did not have the necessary information available in time to avoid the need for fetching such superfluous instruction.

DESCRIPTION OF THE INVENTION

The invention can be described in more detail with the help of the accompanying drawings herein.

FIG. 1 shows a table depicting part of an instruction operating sequence helpful in understanding the invention;

FIG. 2 shows a table depicting a further part of the instruction sequence of FIG. 1 as used by the prior art;

FIG. 3 shows a table depicting a further part of the instruction sequence of FIG. 1 as used in accordance with the invention;

Figure 4:
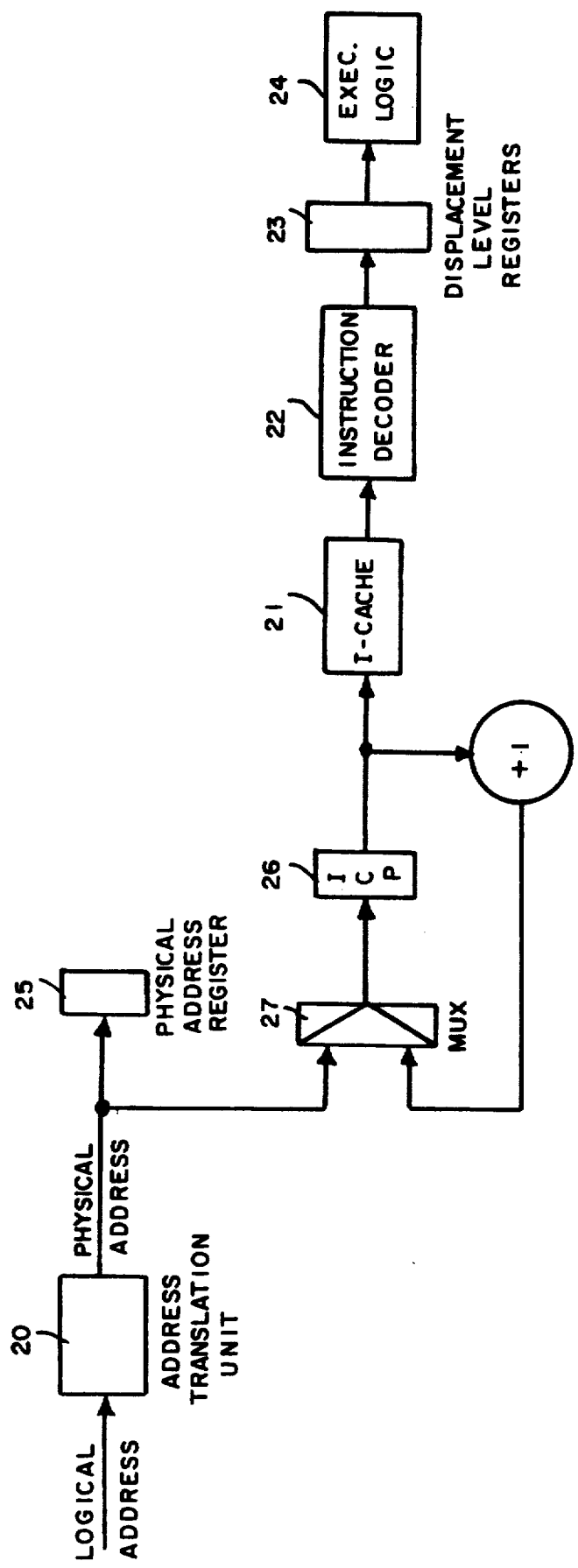
Figure 5:
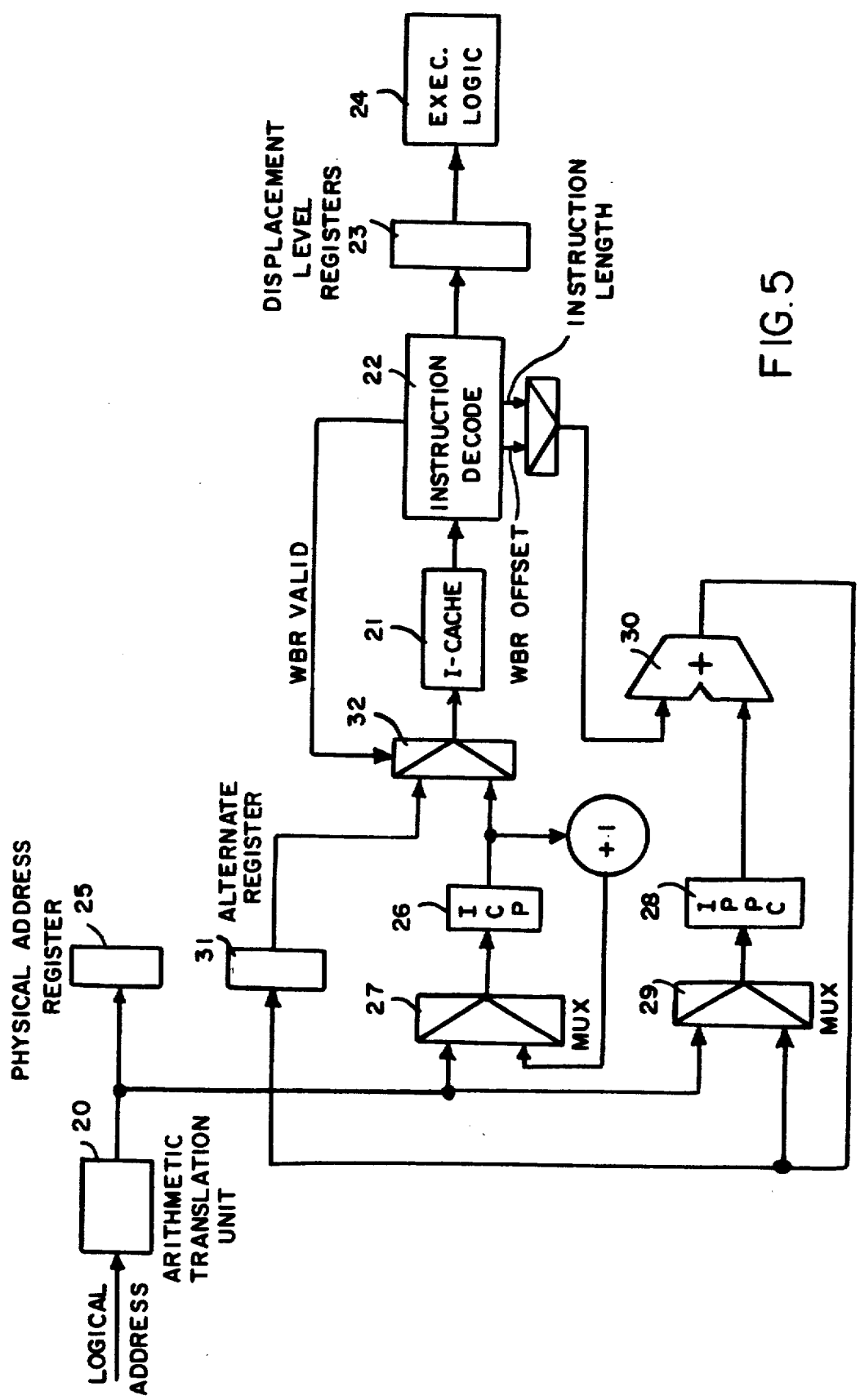
Figure 6:
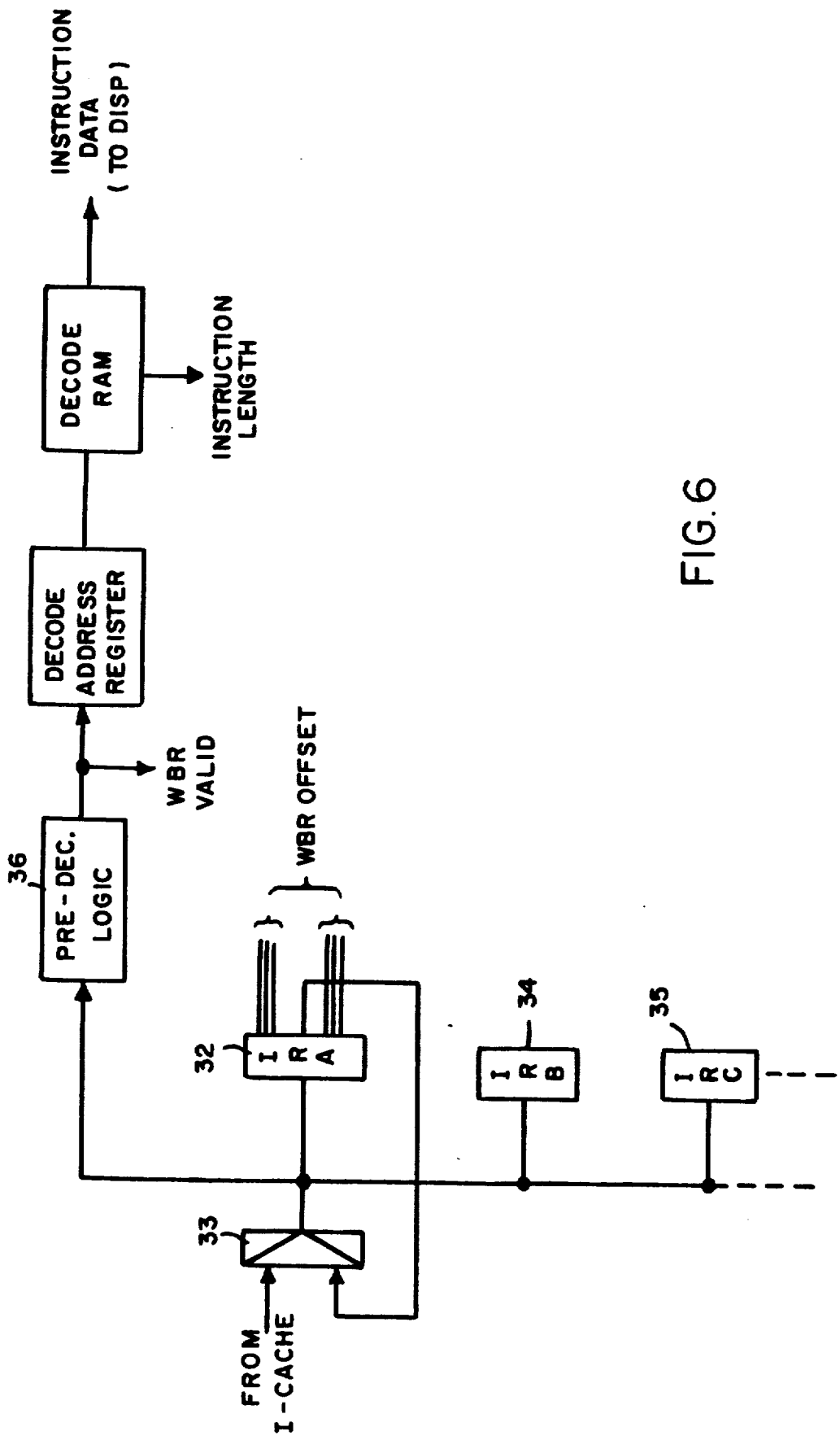

FIG. 3A shows a comparison of sequences of execution steps in accordance with the prior art and the invention, FIG. 4 shows a block diagram of a portion of a prior art system for implementing the execution of a wide branch instruction; and FIG. 5 shows a block diagrams of modifications representing improvements to the prior art system for accelerating the execution of a wide branch instruction in accordance with the invention; and FIG. 6 shows a more detailed block diagram of a portion of the system shown in FIG. 5.

As discussed in more detail later, it is helpful in describing the acceleration technique of the invention to do so in the context of a specific type of system known to the art, which system, as discussed above, is made and sold under the aforesaid MV-Series model designation by Data General Corporation. The structures and operations of such models (e.g. MV-8000, MV-10,000) are known and described in suitable documents available from Data General Corporation and need not be described in more complete detail here. Such further information in connection herewith as may be needed to understand the invention is included in the following description.

Before describing the invention in more detail, it is helpful to discuss a typical instruction sequence in which a wide branch instruction can arise. The following instruction sequence set forth below illustrates such an exemplary sequence of instructions.

| Instruction Memory Location | Instruction | Instruction Interpretation |
|---|---|---|
| . | . | . |
| . | . | . |
| . | . | . |
| 2000 | STA, AC0, 500 | MEM[500]<− −AC0 |
| 2001 | JMP 100 | Jump to Location 100 |
| 100 | LDA AC0, 500 | Load Accumulator, AC0<− −MEM[500] |
| 101 | LDA AC1, 501 | Load Accumulator, AC1<− −MEM[501] |
| 102 | ADD AC0, AC1 | Add Contents of Accumulators, AC1<− −AC0+AC1 |
| 103 | STA, AC1, 502 | Store Added Value,MEM[502]<− −AC1 |

| Instruction Memory Location | Instruction | Instruction Interpretation |
|---|---|---|
| | | -continued |
| 104 | WBR .+50 | Wide Branch to Current Location +50, i.e., to Location 154 |
| 105 | NOT USED | |
| 106 | NOT USED | |
| . | . | . |
| . | . | . |
| . | . | . |
| 154 | DIV | Divide |
| 155 | MUL | Multiply |
| . | . | . |
| . | . | . |
| . | . | . |

In the above sequence, following a store STA) instruction, the next exemplary sequence of instructions requires a jump to a load accumulator instruction at location 100, whereupon the sequence continues through another load accumulator instruction, an addition of the accumulator contents and a storing of the added value. The store instruction is then followed by a wide branch instruction, requiring a branching to the instruction at location 154 (i.e., WBR .+50) displaced by 50 positions from location 104 which is a divide instruction, followed, for example, by a multiply instruction, etc.

The contrast between the sequence as performed using current techniques and the sequence as performed in accordance with the wide branch acceleration technique of the invention can be appreciated by reviewing the accompanying tables set forth as Tables I, II and III, in FIGS. 1, 2 and 3, respectively. Table I shows a sequence of operations which must be commonly performed in both the existing technique and in the new technique of the invention, while Table II and III, respectively show separately the subsequent contrasting sequences of operations used in the existing technique and in the technique of the invention. In each table the contents and operations of the instruction register, or registers (IR), the displacement level information registers (DISP) and the execution level logic (EXEC) are depicted at each stage of sequence.

As seen in Table I, for example, at the first step shown, the JMP 100 instruction at location 2001 is shown as resident in the IR, while information pertinent to the store (STA) instruction is resident in the displacement level registers for effective address (EFA) calculation and subsequent execution by the execution logic. In each case the arrow (←) shows the next instruction or information pertinent to the instruction to be supplied to the registers or logic in question and the equal (=) sign shows the instruction (or instruction information) resident in the register(s) or logic in question. In the beginning of the sequence such execution logic is executing a request for a new instruction (IPOP) at location 2002 for supplying to the IR. The effective address (EFA) calculation is shown for STA instruction. The STA instruction information currently in the displacement register is shown as a valid one, i.e., DV (DISP valid) = 1 and the next displacement level (JMP 100 ) is also shown as a valid one, i.e., NDV (next DISP valid) = 1. Such EFA calculations as used in the aforesaid Data General MV-Series systems are well known in the art.

At step 2, the SUB instruction is executed and the JMP 100 instruction information become resident in the displacement register. Accordingly, the resident displacement register information is valid (DV = 1) but the next instruction (at location 2002) to be supplied to the displacement register, because of the JMP 100 instruction, will not be a valid one (NDV = 0), since it will not be used.

The remaining steps 3-8 show the pipeline operations for fetching, displacement formatting; and executing the accumulator load instructions (LDA, LDA), the add instruction (ADD), and the subsequent store instruction (STA). Step 7 shows that the next instruction to be accessed following such store instruction (STA) is a wide branch instruction (WBR .+50) at location 104 which requires a branch to a location displaced by 50 from location 104, i.e., to location 154. It is in the steps following the supplying of the wide branch instruction to the IR (step 8) where the differences between the existing technique and the new technique of the invention can be demonstrated.

Table II shows that, in the existing and currently known technique, normally the next instruction being fetched in the pipeline following a superfluous instruction at location 105 is a superfluous instruction at location 106 as in Step 9. The first branch target instruction (DIV) at location 154 is then fetched (Step 10) followed by the next instruction of the branch target sequence (MUL) at location 155 (Step 11), and so forth, for subsequent instructions at locations 156 and 157 in steps 12 and 13. The fetching of both superfluous instructions at 105 and 106 prior to fetching the branch target instruction 154 in the pipeline operation causes an execution WAIT at both steps 11 and 12 before the first branch target instruction (DIV) can be executed at step 13.

FIG. III shows an improved method of handling such a branch instruction wherein one of the execution WAIT cycles can be eliminated. As can be seen therein, following the fetching of a superfluous instruction at 105 (step 8) prior to decoding and execution of the branch instruction (WBR +50) in step 8, the next instruction which is fetched, at step 9A, is the branch target instruction (DIV) at location 154, while the STA instruction is being executed. Elimination of the fetching of a further superfluous instruction at 106 effectively eliminates the pipeline operation portions of steps 9, 10 and 11 in Table II, indicated by reference numerals 10, 11 and 12, which are enclosed by the solid line boxes therein, thereby eliminating one of the execution WAIT cycles, e.g., the execution WAIT cycle shown by block 12. In effect, then, in accordance with the improved technique, the three steps 9, 10 and 11 of the previous technique, are effectively replaced by the two steps 9A and 10A of the invention.

The contrast between the prior art technique and the new technique of the invention can be illustrated at the execution level (i.e., at a programmer's level) in FIG. 3A, wherein the sequence of execution steps is depicted from the initial store (STA) instruction to the multiply (MUL) instruction of the example discussed above.

The elimination of an execution WAIT cycle is achieved in accordance with the invention by modifying the hardware used by the prior art system to perform the key pipeline steps in a parallel fashion.

FIG. 5 depicts a block diagram showing one embodiment for implementing the above technique of the invention. It is helpful in understanding the operation thereof to contrast such diagram with a block diagram showing the implementation of the prior art technique. The latter block diagram is depicted in FIG. 4 wherein an address for an instruction is shown as being supplied from a data processing system (not shown) to an address translation unit 20 (ATU) for translating a logical, or virtual, address supplied thereto to a physical address in order to access an instruction at the identified physical location in an instruction cache memory unit (I-Cache) 21. The instruction is appropriately decoded at an instruction decoder 22, supplied to displacement level registers 23 and thence to suitable execution logic 24 of the system. The decoding thereof is in accordance with known instruction decoding techniques as used, for example, in Data General Corporation's above mentioned MV-Series of computers.

A portion of the translated address (i.e., a first selected number of bits representing the physical page thereof) is supplied to a physical register address (PAR) 25, and a second portion thereof representing the word offset on the page is supplied to an instruction cache pointer (ICP) register 26 via multiplexer (MUX) 27. The ICP output initially points to the location of the first word of an instruction in the instruction cache memory 21 which is thereupon supplied to an instruction register in the instruction decode logic 22. If the instruction is more than one word long, the ICP +1 feedback loop supplies the subsequent words thereof for supply to additional instruction registers in decode logic 22. The use of such multiple IR registers in the aforesaid MV-Series systems is known to those in the art. Thus, in the MV-Series of Data General computer systems, the decode logic includes a plurality of instruction registers, identified as IRA, IRB, IRC, . . . etc., for storing multiple words of a multiple-word instruction. Thus, a single word instruction requires the use only of IRA while a two word instruction requires the use of IRA and IRB, etc.

The instruction word, or words, are suitably decoded (or parsed) to provide the information required for execution of the instruction, such information being supplied to execution logic 24 via displacement level registers 23, as would be well known to the art. Such operation would occur for the execution of any instruction, including a wide branch instruction.

In order to accelerate the execution of a wide branch instruction, additional logic is utilized as shown in FIG. 5. In addition to the ICP register, the system uses an instruction parser program counter (IPPC) register 28 which initially receives the same word offset information as ICP 26 via a multiplexer 29. The IPPC is updated by adding the instruction length to its current value and loading it back into the IPPC at the appropriate time as the instruction stream moves through the IR's. The IPPC thereby always contains a memory address corresponding to the instruction data in IRA. During the decoding process, the branch offset information (WBR OFFSET) required in the wide branch instruction (represented by selected decoded bits of the wide branch instruction code) is provided to adder circuit 30 and added to the contents of the IPPC (which points to the location of the WBR instruction). The output of adder 30 is an address that identifies the target location of the WBR instruction (i.e., the branch target). Such address is supplied directly to an alternate (ALT) register 31 so that the instruction at the branch target can be immediately fetched from the cache unit 21 via a multiplexer 32.

The portion of the instruction decode logic 22 required for so accelerating the wide branch instruction is shown in FIG. 6. As seen therein, the first word of the instruction in the instruction cache unit 21 is supplied to the first instruction register (IRA) 32 via multiplexer 33 and subsequent words are supplied to further registers 34 (IRB), 35 (IRC), etc. The first word is also simultaneously supplied to pre-decode logic 36 which, in addition to performing other tasks (such pre-decode logic is used in the aforesaid MV-Series and is known to the art), provides a suitable indication when the particular instruction currently being decoded is a wide branch instruction. Such indication is, for example, in the form of a "WBR VALID" signal, as shown.

The handling of such a wide branch (WBR) instruction can be explained using the diagrams of FIGS. 5 and 6. The word offset identifying the address of the WBR instruction is resident in ICP 26. Since the WBR instruction is only a single word in length, such word is fetched from I-Cache unit 21 and supplied to the IRA register of decode logic 22. Simultaneously, the address of the WBR instruction opcode is formed and supplied to IPPC 28 (e.g. for the exemplary sequence shown in FIG. 3A, when the WBR opcode is in IRA, IPPC 28 contains the address 104). During the decoding process, selected bits from the IRA register define the WBR OFFSET (see FIG. 6). Such WBR offset information, when added to the contents of IPPC 28, forms the branch target address.

In the particular example being discussed above, the WBR OFFSET (50) from instruction decode 22 (see FIG. 5) is added via adder 30 to the contents of IPPC 28 (104) to form the branch target address 154). Such address is supplied to ALT register 31 and is thereupon supplied to I-Cache 21 via multiplexer 32 to fetch the branch target instruction at location 154 on an accelerated basis.

In effect, the use of the IPPC, ADDER, and ALT units, together with MUX's 29 and 32, and the generation of the WBR VALID signal in pre-decode logic 22, as shown in FIGS. 5 and 6, accelerate the WBR instruction. In effect the added units permit the system to recognize that a WBR operation is going to be performed, i.e., the pre-decode unit of the decode logic 22 provides a WBR VALID signal, simultaneously as the WBR instruction is being supplied to the IRA register. Such immediate recognition of the presence of a valid WBR instruction permits the branch target address to be immediately provided, via IPPC 28, adder 30, ALT 31 and MUX 32, for use in fetching the branch target instruction from I-Cache 21 one cycle faster than prior art systems using the previous technique discussed in accordance with FIG. 4.

What is claimed is:

1. A method of performing a branching operation in a data processing system in accordance with a branch instruction which requires an unconditional branching from a current instruction of a first sequence of instructions to a first instruction of second sequence of instructions, said first instruction being at a location which is displaced from that of said branch instruction, said method comprising the steps of fetching, in sequence, the branch instruction, the next instruction following the branch instruction of said first sequence, the first instruction of said second sequence, the second instruction of said second sequence, and the third instruction of said second sequence;

always executing the branch instruction following the fetching of said first instruction;

providing an execution wait cycle following the executing of said branch instruction and the fetching of said second instruction during which execution wait cycle no execution ever occurs; and executing the first instruction of said second sequence following the execution wait cycle and the fetching of said third instruction.

2. A method in accordance with claim 1 and further including the steps of displacement formatting said branch instruction before execution thereof;

displacement formatting said next instruction before the execution wait cycle; and displacement formatting the first instruction of said second sequence before execution thereof.

3. A method of performing a branching operation in a data processing system, which includes a plurality of instruction registers, in accordance with a branch instruction which requires a branching from a current instruction of a first sequence of instructions to a first instruction of a second sequence of instructions, said first instruction being at a location displayed from that of said branch instruction, said method comprising the steps of fetching the branch instruction;

fetching the next instruction of said first sequence following the branch instruction and selectively placing the branch instruction into one or more of the instruction registers;

fetching the first instruction of said second sequence while decoding and displacement formatting said branch instruction and selectively placing the branch instruction into one or more of the instruction registers;

fetching the second instruction of said second sequence while decoding and displacement formatting said next instruction, selectively placing the first instruction into one or more of the instruction registers, and always executing said branch instruction;

fetching the third instruction of said second sequence while decoding and displacement formatting said first instruction and, selectively placing the second instruction into one or more of the instruction registers, and providing an execution wait cycle during which no instruction execution ever occurs.

4. A method in accordance with claim 3 wherein said data processing system includes a plurality of instruction registers and further including the steps of selectively placing the branch instruction into one or more of said instruction registers following the fetching thereof, for decoding and displacement formatting, while fetching said next instruction;

selectively placing said next instruction into one or more of said instruction registers following the fetching thereof, while decoding and displacement formatting said branch instruction and fetching said first instruction;

selectively placing said first instruction into one or more of said instruction registers following the fetching thereof, while executing said branch instruction and fetching said second instruction;

selectively placing said second instruction into one or more of said instruction registers following the fetching thereof, while fetching said third instruction, decoding and displacement formatting said second instruction and producing said execution wait cycle; and selectively placing said third instruction into one or more of said instruction registers following the fetching thereof, while fetching a fourth instruction of said second sequence, decoding and displacement formatting said second instruction, and executing said first instruction.

5. Instruction handling means for use in a data processing system comprising instruction storage means;

means responsive to an address of an instruction located in said instruction storage means for providing said address to said instruction storage means, whereby the instruction located at said address is supplied from said instruction storage means;

instruction decoding means responsive to the instruction provided from said instruction storage means for decoding said instruction to produce operating information for use in executing said instruction and displacement information for use in determining an address of a subsequent instruction;

execution means responsive to said operating information for executing an instruction;

address providing means responsive to said displacement information for providing an address of a subsequent instruction to be provided from said instruction storage means;

said address providing means including acceleration logic means, responsive to displacement information of a branch instruction which requires the unconditional branching from a current instruction of a first sequence of instructions to a first instruction of a second sequence of instructions, said first instruction being at an address in said instruction storage means which is displayed from that of said branch instruction, for providing the address of said first instruction at the same time said branch instruction is being decoded by said instruction decoding means;

whereby said first instruction can be provided from said instruction storage means and can be decoded and subsequently executed after a wait of only a single execution cycle, during which no instruction execution ever occurs, following the execution of said branch instruction.

6. Instruction handling means in accordance with claim 5 wherein said acceleration logic means includes first register means which contains the address of said branch instruction at the same time said branch instruction is being decoded by said instruction decoding means;

means for adding the displacement information provided when the branch instruction is decoded by said from the instruction decoding means to the branch instruction address from said first register means at the same time the branch instruction is decoded by said instruction decoding means to produce a target address of said first instruction in said instruction storage means; and means responsive to said target address for providing said target address to said instruction storage means whereby said first instruction is produced from said instruction storage means.

7. Instruction handling means in accordance with claim 6 wherein said target address providing means includes a second register means and a multiplexer means for providing said target address to said instruction storage means.

8. Instruction handling means in accordance with claim 7 wherein said instruction decoding means includes pre-decoding means responsive to said branch instruction for providing an indication that the branch instruction to be decoded is a valid instruction, said multiplexer means being responsive to said indication for permitting the target address of said first instruction to be supplied to said instruction storage register for providing said first instruction therefrom.

* * * * *